June 21, 1932.    B. A. MOORE    1,863,870
COUPLING
Filed June 19, 1929    2 Sheets-Sheet 1
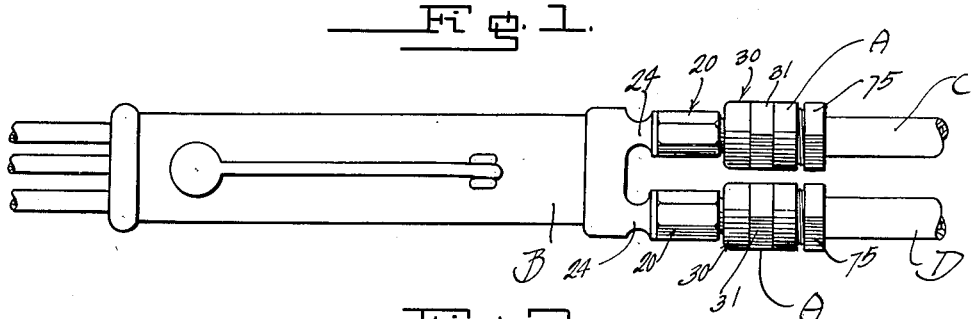
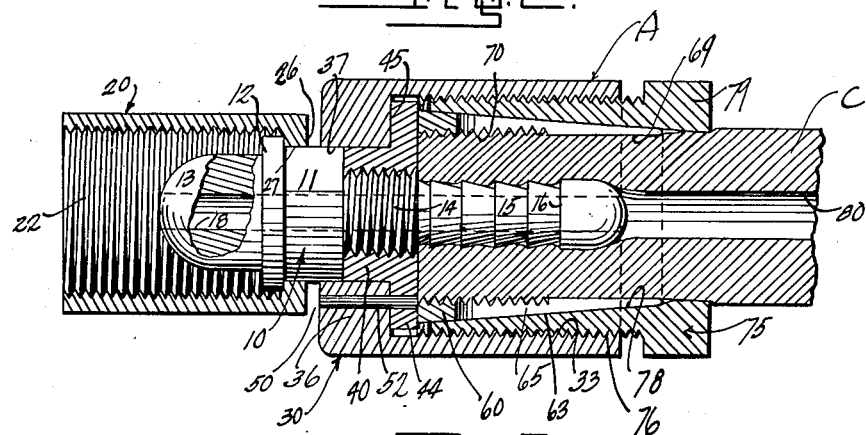
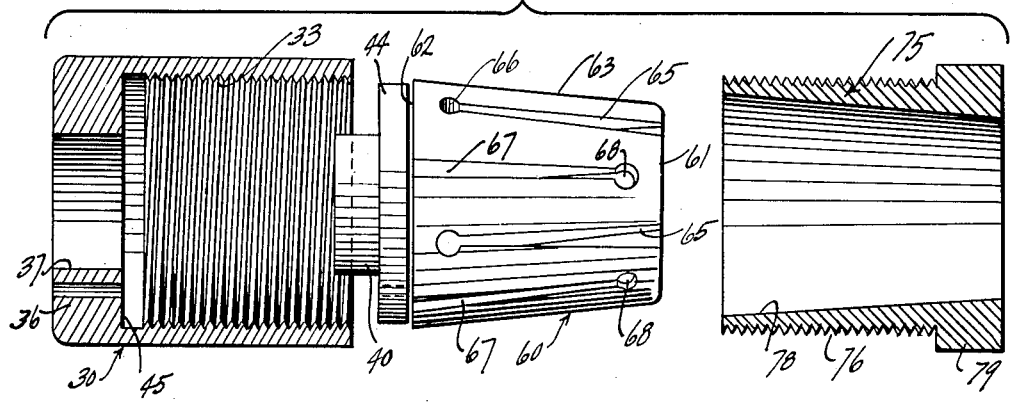
INVENTOR.
Bruce A. Moore
BY
ATTORNEYS.

June 21, 1932.   B. A. MOORE   1,863,870
COUPLING
Filed June 19, 1929    2 Sheets-Sheet 2
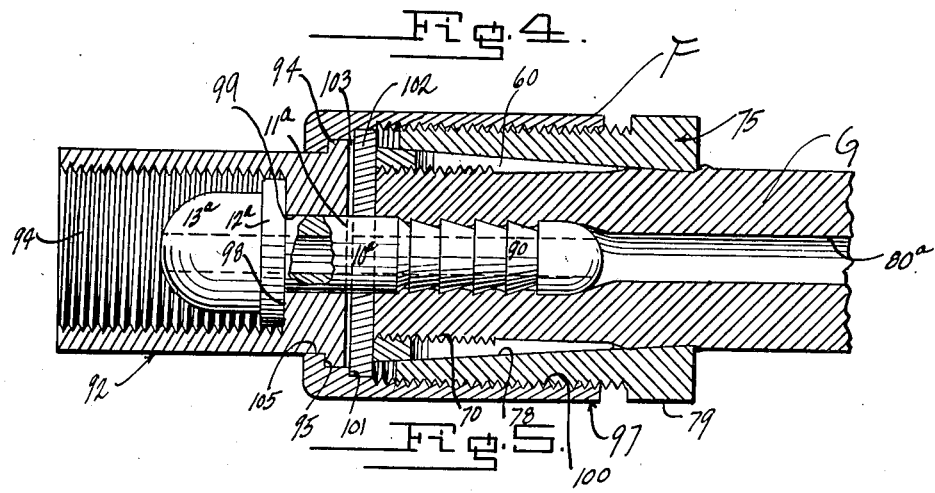
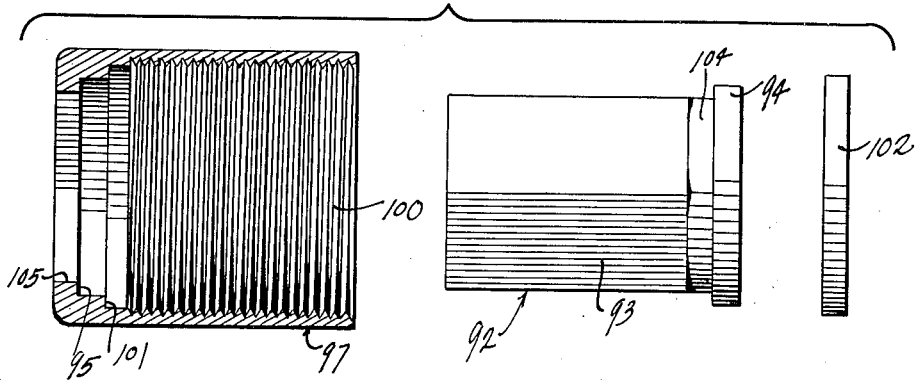
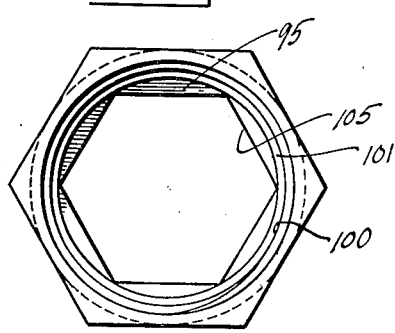
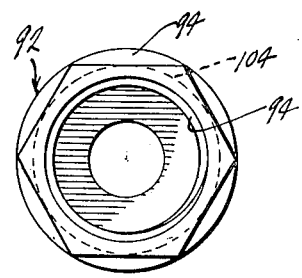
INVENTOR.
Bruce A. Moore
BY *Lancaster and A. Alvine*
ATTORNEYS.

Patented June 21, 1932

1,863,870

UNITED STATES PATENT OFFICE

BRUCE A. MOORE, OF ASHLAND, KENTUCKY

COUPLING

Application filed June 19, 1929. Serial No. 372,147.

This invention relates to improvements in couplings.

The primary object of this invention is the provision of a hose coupling, particularly well adapted to be used for attaching flexible hose to equipment, such as torches, pneumatic tools, and the like, with nuts that will enable the expeditious attachment or detachment of the coupling parts to the equipment or to the hose, without the intervention of special tools.

A further object of this invention is the provision of a compact and efficient type of coupling, which may be quickly attached or detached with respect to equipment or hose, and which is of such nature that the forces tending to pull the hose from the equipment to which connected will tend to more firmly wedge the hose into its clamped relation to the equipment or some part connected therewith, such as a nipple.

A further object of this invention is the provision of an improved hose coupling or clamp which may be used in connection with gas cutting or welding torches, or for the connection of hose to pneumatic tools. Such type of tools are subject to be pulled and jerked throughout the work which they are intended to perform, and because of this, hose couplings very often permit the leaking of the pressure fuel or fluid, which entails stoppage of work, and sometimes a hazard in the use of welding torches.

Other objects and advantages of this invention will be apparent during the course of the following detailed description.

In the drawings, wherein for the purpose of illustration are shown preferred and modified forms of the invention.

Figure 1 is a view showing the improved couplings used to connect lengths of hose to a torch, such as used for welding.

Figure 2 is an enlarged sectional view taken longitudinally of the coupling, showing a length of hose attached thereto.

Figure 3 is a view showing disassembled details of the improved coupling.

Figure 4 is a longitudinal sectional view taken through a modified type of hose coupling, showing it attached to a length of hose.

Figure 5 is a view showing disassembled details of the coupling of Figure 4.

Figures 6 and 7 are other views showing details of the modified form of coupling.

In the drawings, wherein similar reference characters designate corresponding parts throughout the several views, the letter A may generally designate the preferred type of coupling which may be used as designated in Figure 1 upon a welding torch B for the purpose of connecting flexible hose lengths C and D thereto, for well known reasons. In lieu of the preferred form of coupling A, a modified form of coupling F, shown in Figures 4 to 7 inclusive, may be substituted. The couplings A and F may be generally used wherever a durable type of coupling is essential for connecting hose to some equipment or appliance where a tight connection is desirable.

Referring to the coupling A, the same includes a nipple, generally designated at 10, consisting of a cylindrical shaped body portion 11 having an annular flange 12 at one end thereof and a dome-like extension 13 at the opposite side of the flange 12 from the body 11. The nipple 10 at the opposite end of the body 11 is provided with a left hand screw threaded shank 14, and at its extreme end it is provided with an annularly grooved or corrugated portion 15, defining a series of shoulders 16 facing abruptly in the direction of the screw threaded shank 14, and for the obvious purpose of retaining on the nipple any hose which is slipped thereover. The nipple 10 has a passageway 18 therethrough from end to end.

On the body 11 there is rotatably supported a nut 20, which has a polygonal shaped exterior for wrench engaging purposes, and which is internally threaded at 22 for receiving therein the screw threaded shank of some attaching equipment or appliance, such as the shank 24 of the torch or burner B, shown in Figure 1. This nut 22 is held swivelly on the body 11, by means of an inwardly extending annular attaching flange 26, having a circular opening 27 therethrough which rotatably receives the body 11 in snug fitting relation thereon, and abuts against the flange 12 to prevent the endwise movement of the nipple from the nut 20. Of course, the nut 20 may be slipped onto the nipple from the corrugated shank portion end thereof, prior to attachment of the nipple upon the hose.

An external nut or attaching body 30 is provided, the same thereon having an external polygonal surface 31 for wrench engaging purposes, and internally thereof providing a screw threaded socket 33 open at one end thereof, and at the other end the head nut 30 having an annular flange 36, with a passageway 37 therethrough of the same diameter as the external diameter of the body 11, or slightly larger to permit the swiveled of the nipple body 11 therein in a rotatable relation. A flanged nut 40, provided with a left hand threaded passageway axially therethrough is threaded on the portion 14 of the nipple, into engagement with the shoulder at which the shank 14 is connected with the body 11 of the nipple. At its opposite end the nut has an annular flange 44 adapted to engage against the internal shoulder 45 formed by the annular flange 36 of the nut 30, for the purpose of swivelly holding the nut 30 in place upon the nipple, so that there is a clearance, designated at 50, between the end facing surfaces of the nuts 20 and 30, as shown in Figure 2. The nut 30 is of course assembled upon the shank of the nipple prior to the time that the flange nut 40 is screw threaded into place as above described.

It is preferred to key the flange nut 40 to the nut 30, and to this end the same are provided with aligning passageways adapted to receive a pin 52, connecting the same, as shown in Figure 2 of the drawings, or some other means may be provided for connecting them in this relation. It is of course understood that by reason of the wrench portion 31, the flange nut, in connection with the nut 30, may be threaded in place or disconnected from the shank 14.

A novel type of split clamping sleeve 60 is provided, shown in detail in Figure 3 of the drawings, which is tapered from the end 61 to the end 62, adapted to seat against the flange nut 40; the external surface 63 tapering in a convergent relation towards the end 61. Splits 65 are extended from the end 61 for the major length of the sleeve 60 and terminating in enlarged circular openings 66 short of the end 62, and alternating therewith are splits 67 extending from the end 62 and terminating in enlarged circular openings 68 just short of the end 61. These splits enable a compressive action of the split sleeve, which is provided with a passageway 69 therethrough, through which the hose C or D may be slipped. At the larger end 62 the opening 69 thru the split sleeve is internally threaded at 70, or corrugated, or provided with prongs or other serrations to bite into the flexible or yieldable hose C or D upon insertion therein.

An internal nut 75 is provided, having an externally screw threaded shank 76 for screw threading in the socket 33 of the nut 30; the nut 75 having a tapered bore or passageway 78 which is adapted to receive therein the tapered surface 63 of the split sleeve 60. This nut 75 is provided with a polygonal head portion 79 thereon exteriorly at the open end of the nut 30, and therefrom the bore 78 diverges in a tapered relation, so that upon continued screw threading in the socket 33 the same will tighten the split sleeve 60 in a clamped relation upon the hose C, for compressing the same and forcing the serrations 70 thereinto, as well as compressing the hose internally into the corrugations 15 and shoulders provided thereby, at 16, upon the nipple which extends through the bore 80 of the hose C, as shown in Figure 2.

Referring to the modified form of coupling F, the nipple portion 10$^a$ thereof is provided with a cylindrical shaped externally smooth body portion 11$^a$ having at one end the annular flange 12$^a$ and dome shank 13$^a$. At its other end it is provided with the usual corrugated nipple extension 90, adapted to be slipped into the passageway 80$^a$ of a length of hose G, shown in Figure 4.

An appliance attaching nut 92 is provided, having an external polygonal shaped surface 93, for the major length thereof, and providing a screw threaded socket 94 therein opening at the free end. At the opposite end it is provided with the annular flange 94 adapted to seat against the shoulder 95 at the end of the socket in the external nut or attaching body 97, which will be subsequently mentioned. At the end of the screw threaded socket 94, the nut 92 is reduced, to provide a shoulder 98 against which the shoulder at the flange 12$^a$ of the nipple abuts, and the nut 92 is provided with a bore 99 through which the body 11$^a$ of the nipple 10$^a$ extends.

The nut 97 is provided with a screw threaded socket 100 therein, opening at an end thereof, opposite the shoulder 95, and between the shoulder 95 and the socket 100, there is a counterbore defining an annular shoulder 101 facing toward the open end of the nut, away from the shoulder 95, and of course annularly beyond the shoulder 95. It is adapted to receive thereagainst a flat washer 102, in order to provide a clearance 103 between the end of the nut 92 where the latter is connected at its annularly flanged portion 94 within the nut 97, as shown in Figure 4. The nut 92 adjacent the annular flange 94 is provided with an annular surface 104, where the same extends through the polygonal passageway at the end of the nut 97, shown at 105 in Figure 6 of the drawings. This polygonal passageway 105 enables the polygonal shank surface 93 of the nut 92 to be slipped through the nut 97, and the extreme diameter from which the surface 104 of the nut 92 is struck is the same as the distance between any opposite parallel plane surfaces of the polygonal portion 93 of the said nut 92.

The coupling F employs a split sleeve 60, exactly the same as the split sleeve 60 of the preferred form of invention A, and also employs an internal nut 75 in the same cooperating relation as the nut 75 of the preferred form of invention A. Similar reference characters have been applied to the parts 60 and 75 for both forms of the invention A and F.

In the form of invention A it is to be noted that the nipple is assembled first upon the nut 20, and then the nuts 30 and 40 are assembled thereon. The split sleeve 60 and nut 75 are assembled upon the hose C, and the hose is then slipped onto the corrugated portion of the nipple. Thereafter the split sleeve 60 is slipped along the hose into the socket of the nut 30 and the nut 75 then is drawn up into engagement with the nut 30 and threaded until the sleeve 60 is clamped to the desired extent upon the hose C.

In the form of invention F it should be noted that the external nut or body 97 and the nut 92 are swivelly interconnected, and that the small end of the nipple is slipped first through the nut 92 and thence into the socket of the nut 97. The washer 102 is of course placed as described prior to the slipping of the hose G upon the nipple, and prior to the clamping of the split sleeve by the nut 75 in the relation shown.

Various changes in the shape, size, and arrangement of parts may be made to the forms of invention herein shown and described, without departing from the spirit of the invention or the scope of the claims.

I claim:

1. In a hose clamp a nipple having a portion adapted to extend into the passageway of a length of hose, and at its opposite end having an annular retaining flange, an internally threaded nut for attachment to some appliance, rotatably connected upon the nipple between said hose inserting portion and said retaining flange and held against displacement from the nipple by the latter, a pair of other nuts interengageably threaded, means associating said last mentioned nuts with the nipple for limited endwise movement therewith, the said interengageable nuts being independently rotatable with respect to the nipple, and wedging means associated with the pair of nuts and about the hose for clamping the latter against the nipple received therein.

2. In a hose clamp a pair of interengageably threaded hollow clamping nuts adapted to receive a section of hose therethrough to be clamped, a split sleeve within said nuts being split from opposite ends thereof, and a third nut rotatably supported by one of the pair of nuts and having an outwardly facing screw threaded socket.

3. As an article of manufacture a split metal sleeve having an internally roughened passageway therethrough and an externally tapered surface, said sleeve having splits longitudinally thereof opening from opposite ends thereof, said splits opposite their opening ends terminating in dead ends in the sleeve.

4. In a hose coupling the combination of a nipple, an appliance attaching nut swivelly mounted on the nipple against end movement from one end thereof, the nipple beyond said nut having a hose inserting shank, a second nut rotatably mounted on the first mentioned nut at an end thereof, the second nut being hollow and provided with an internally screw threaded socket within the area of which the hose inserting shank of the nipple lies, the second nut having a counterbore therein, a washer seating in the counterbore and in such relation that when tightly seated therein the first mentioned nut may rotate without being bound against the second nut, a split sleeve adapted to seat at an end against said washer in the area of the second mentioned nut and adapted to receive a length of hose therein between the same and the hose inserting shank of the nipple, and a third nut adjustably threaded with the second nut and therein in clamping engagement with the split sleeve.

BRUCE A. MOORE.